July 11, 1933.  H. K. MARTIN  1,918,117
METHOD OF AND MEANS FOR PREVENTING AQUEOUS LIQUIDS
FROM DRIPPING FROM THE LIPS OF VESSELS
Filed July 6, 1931
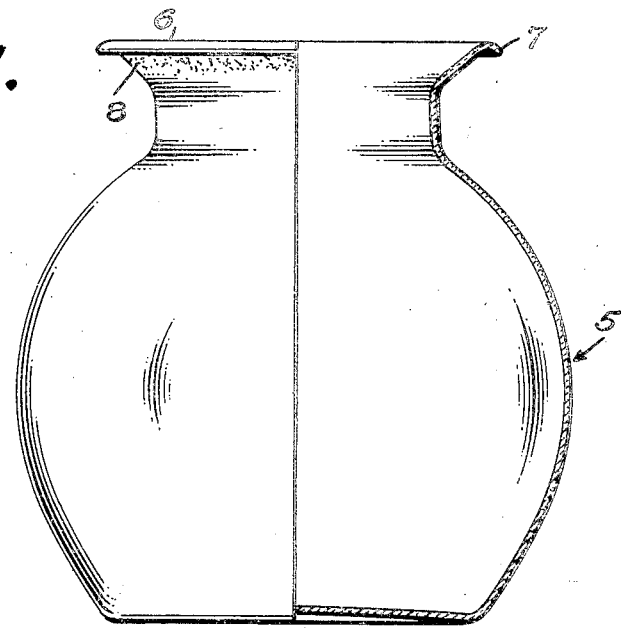
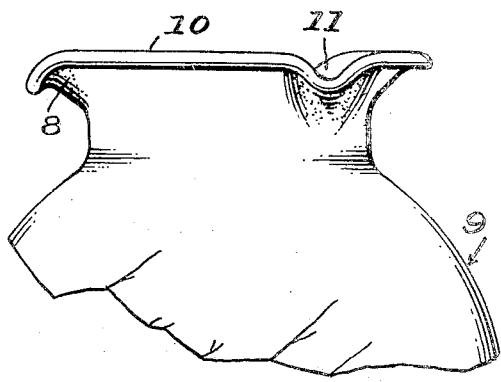
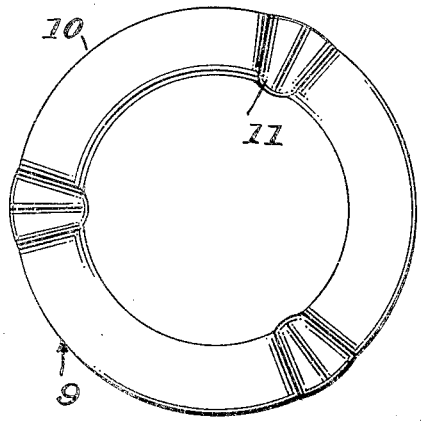
INVENTOR.
H. KAYE MARTIN.
BY Dorsey & Cole
ATTORNEYS.

Patented July 11, 1933

1,918,117

UNITED STATES PATENT OFFICE

HAROLD KAYE MARTIN, OF CORNING, NEW YORK, ASSIGNOR TO CORNING GLASS WORKS, OF CORNING, NEW YORK, A CORPORATION OF NEW YORK

METHOD OF AND MEANS FOR PREVENTING AQUEOUS LIQUIDS FROM DRIPPING FROM THE LIPS OF VESSELS

Application filed July 6, 1931. Serial No. 549,046.

This invention relates to culinary vessels and more particularly to that type of vessel which is provided with a lip or spout for the purpose of pouring liquids.

It is a common fault with most vessels of this type that when the vessel is retracted from the pouring position, the breaking of the liquid stream leaves a drop of liquid on the edge of the lip or spout which tends to drip therefrom or to recede underneath and run down the outside of the vessel.

This invention has for its object the prevention of the after-drip of vessels from which aqueous liquids are poured.

The above and other objects may be attained by practicing my invention which embodies among its features the proper shaping of the outer edge of the lip or spout of the vessel and the treatment of the outside thereof with a coating which will prevent the wetting of the glass by aqueous solutions.

My invention is applicable to vessels made of glass, china, glazed porcelain, and the like and particularly to glass tea pots.

In the drawing:

Fig. 1 is a side view partly in section of a glass tea pot made in accordance with my invention;

Fig. 2 is a side view of the neck of a tea pot of slightly different design; and Fig. 3 is a plan view of the tea pot illustrated in Fig. 2.

The tea pot 5 illustrated in Fig. 1 is of a type in which the tendency for liquids to drip or run down the outside is quite pronounced due to the broad and relatively flat rim 6. In this type of tea pot I have found that this tendency to drip may be reduced to a minimum by slightly rolling down the edge of the rim as illustrated at 7. However, this alone is not sufficient to prevent dripping and I have further found that by applying a coating 8 to the under side of the rim in a manner hereinafter to be more fully described I can entirely prevent dripping.

In Fig. 2 I have illustrated a tea pot 9 similar to that shown in Fig. 1 except that the pot is provided with a flat rim 10 which is formed with one or more depressions or lips 11. The number of these lips may be varied at will and I have found that they are most advantageously formed during fabrication of the tea pot from the plastic glass. A tea pot of this type has certain advantages over that of the type shown in Fig. 1 in that a stream poured therefrom is relatively narrow and at the cessation of pouring is broken more quickly and cleanly than is the stream produced by a flat rimmed vessel.

In making a non-dripping tea pot according to my invention I take the molded and annealed article, for example, the one illustrated in Fig. 1 having the edge of the rim slightly rolled down during molding, and I heat the neck and rim of the vessel to a temperature approximating 300 to 400° C. I then place the tea pot in a rotary chuck driven from any suitable source of power and while it is rotating I apply a jet of fumes of titanium tetrachloride to the hot under-surface and outer edge of the rolled-over rim 7. While doing this I protect the upper and inner surface of the rim from contact with the fumes by shielding the mouth of the tea pot with asbestos board or other suitable material. The time of exposure to the fumes may be varied at will but I have found that usually about thirty seconds exposure is ample to produce the desired result.

The fumes of titanium tetrachloride may be produced by passing a stream of dry air through liquid anhydrous titanium tetrachloride in a suitable container such as an Erlenmeyer flask provided with delivery tubes. The volume of the fumes may be greatly increased by applying heat to the flask containing this salt.

The fumes on coming into contact with the hot glass form a coating on the glass which I believe to be an oxide of titanium and which is resistant to abrasion and practically insoluble in acids. This coating is closely incorporated with the surface of the glass and is extremely thin, from .001 to .03 mm., and on this account sometimes appears iridescent.

Observation shows that when a drop of water contacts with glass so treated, its angle of contact is greater than when a similar drop contacts with untreated glass. This is due to the fact that the adhesion between water and untreated glass is greater than that between water and glass which has been treated by my process. Consequently, the water tends to draw up into drops on such surfaces instead of spreading out in a thin film as is the case with untreated glass surfaces. Therefore, when an aqueous liquid such as tea is poured from a pot treated as above described the outer edge of the rim is not wet by the flowing liquid and when the stream is broken by returning the pot to the upright position it breaks cleanly and the liquid which would normally remain as a drop at the outer edge of the rim is retracted by surface tension or cohesion to the main body of liquid and returns therewith into the pot.

There are many salts which may be used to produce my non-wetting surface such as, for example, tin chloride, ferric chloride, titanium tetrachloride, silicon tetrachloride and etc. These may either be fumed on to the hot glass as described in which case the ferric chloride must be heated strongly, or they may be sprayed onto the hot glass by atomizing a water solution of the desired salt. I prefer to use fumes of either titanium tetrachloride or silicon tetrachloride because these salts have a relatively high vapor pressure at slightly elevated temperatures and will produce stable coatings at relatively low glass temperatures, about 250 to 400° C., that is, they may be applied to the glass to produce the desired result without the necessity of heating the article up to or above the annealing temperature. By using titanium tetrachloride or silicon tetrachloride, therefore, I avoid the necessity of annealing the article after it has been coated. Furthermore, the coatings produced by titanium tetrachloride and silicon tetrachloride, aside from a slight iridescence are practically colorless and do not detract from the appearance of the article.

Although I have described the specific embodiment of my invention as related to the manufacture of non-dripping tea pots it is to be understood that my invention contemplates the production of household vessels of other types wherein it is desired to prevent dripping after pouring such as, for example, water pitchers and the like.

By "permanently incorporated" as herein used, I mean the close incorporation and the resulting lasting adhesion of the coating which is obtained by my invention as distinguished from the adhesion of paint or the like which depends upon the adhesive qualities of its vehicle, or as distinguished from the adhesion of a metallic coating deposited by electrolysis which is soluble in acids.

I claim:

1. A vessel having a pouring lip, a portion of which has permanently incorporated with its surface a transparent fired on coating of metallic oxide which resists wetting by aqueous solutions.

2. A glass tea pot having a pouring lip which has permanently incorporated with its surface a transparent fired on coating of metallic oxide which resists wetting by aqueous solutions.

3. A glass tea pot having a pouring lip with a rolled-down rim, the under side and outer edge of the surface of which are provided with a permanently incorporated transparent fired on coating of metallic oxide which resists wetting by aqueous solutions.

4. A vessel having a pouring lip, a portion of which has permanently incorporated with its surface a transparent fired on coating of titanium oxide which resists wetting by aqueous solutions.

5. A vessel having a pouring lip, a portion of which has permanently incorporated with its surface a transparent fired on coating of silicon oxide which resists wetting by aqueous solutions.

HAROLD KAYE MARTIN.